(12) United States Patent
Saito (10) Patent No.: US 9,729,839 B2
(45) Date of Patent: Aug. 8, 2017

(54) DISCHARGE LAMP DRIVE DEVICE, PROJECTOR, AND DISCHARGE LAMP DRIVE METHOD

(71) Applicant: SEIKO EPSON CORPORATION, Tokyo (JP)

(72) Inventor: Osamu Saito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/982,522

(22) Filed: Dec. 29, 2015

(65) Prior Publication Data
US 2016/0286179 A1    Sep. 29, 2016

(30) Foreign Application Priority Data

Mar. 27, 2015    (JP) .................. 2015-065921

(51) Int. Cl.
*H04N 9/31*    (2006.01)
*H05B 41/288*    (2006.01)

(52) U.S. Cl.
CPC ....... *H04N 9/3155* (2013.01); *H05B 41/2887* (2013.01); *Y02B 20/202* (2013.01)

(58) Field of Classification Search
CPC ............ H05B 41/2828; H05B 41/2883; H05B 41/2928; H05B 41/386; H05B 41/28; H05B 41/382; G03B 21/2026; G03B 21/2053; G03B 21/006; G03B 21/142; G03B 21/14
See application file for complete search history.

(56) References Cited

U.S. PATENT DOCUMENTS

| 2006/0055345 | A1 | 3/2006 | Takeuchi |
| 2013/0250254 | A1* | 9/2013 | Saito .................. H05B 41/2828 353/85 |
| 2015/0192846 | A1 | 7/2015 | Terashima et al. |

FOREIGN PATENT DOCUMENTS

| JP | H03-167796 A | 7/1991 |
| JP | 2007-027145 A | 2/2007 |
| JP | 2008-171741 A | 7/2008 |
| JP | 2013-164966 A | 8/2013 |
| JP | 2015-079648 A | 4/2015 |

* cited by examiner

*Primary Examiner* — Alexander H Taningco
*Assistant Examiner* — Seokjin Kim
(74) *Attorney, Agent, or Firm* — Oliff PLC (57) ABSTRACT

A discharge lamp drive device includes a resonant circuit section connected to a discharge lamp, a power conversion section configured to convert direct-current power into alternating-current power, and supply the discharge lamp with the alternating-current power via the resonant circuit section, and a control section configured to supply the discharge lamp with the alternating-current power having a first frequency and a second frequency higher than the first frequency in a lighting start period until the discharge lamp reaches a steady lighting state, the first frequency is a frequency for causing a resonance of the resonant circuit section, and the second frequency is a quasi-resonant frequency.

17 Claims, 5 Drawing Sheets

DISCHARGE LAMP DRIVE DEVICE, PROJECTOR, AND DISCHARGE LAMP DRIVE METHOD

BACKGROUND

1. Technical Field

The present invention relates to a discharge lamp drive device, a projector, and a discharge lamp drive method.

2. Related Art

As shown in, for example, JP-A-2007-27145 (Document 1), there has been known a projector equipped with a resonant circuit in order to obtain a high voltage for starting discharge of the discharge lamp. In such a projector, when lighting the discharge lamp, the high voltage can be obtained by matching the frequency of the alternating-current power supplied to the discharge lamp with the resonant frequency of the resonant circuit.

Incidentally, individual difference and aging variation exist in the inductance component and the capacitance component of the resonant circuit. Therefore, if the frequency of the alternating-current power, which is supplied to the resonant circuit when lighting the discharge lamp, is fixed, there can occur the case in which the resonance fails to occur, and as a result, the discharge lamp fails to light. In order to avoid such a problem, according to the technology disclosed in Document 1, the frequency of the alternating-current power supplied to the discharge lamp is increased monotonically toward the resonant frequency to thereby find out the actual resonant frequency in every lighting operation.

However, in this method, in the period until the discharge lamp starts lighting, there continues the state in which the frequency of the alternating-current power is approximate to the resonant frequency. Therefore, the voltage and the current in the resonant circuit increase, and the heat generation in the resonant circuit increases. Thus, there is a possibility that elements of the drive device of the discharge lamp are damaged.

To deal with the problem described above, it is possible to adopt a method of providing a period, in which the frequency of the alternating-current power is set to a value substantially different from the resonant frequency, to thereby decrease the voltage and the current in the resonant circuit. However, if the voltage in the resonant circuit is too low, in the case in which the discharge lamp is put off in the period of setting the frequency of the alternating-current power to the value substantially different from the resonant frequency, it is difficult for the discharge lamp to relight. Therefore, there is a problem that the lighting performance of the discharge lamp degrades.

SUMMARY

An advantage of some aspects of the invention is to provide a discharge lamp drive device capable of inhibiting the lighting performance from degrading while inhibiting damages of the elements when lighting the discharge lamp, a light source device equipped with such a discharge lamp drive device, and a projector equipped with such a light source device. Another advantage of some aspects of the invention is to provide a discharge lamp drive method capable of inhibiting the lighting performance from degrading while inhibiting damages of the elements when lighting the discharge lamp.

A discharge lamp drive device according to one aspect of the invention includes a resonant circuit section connected to a discharge lamp, a power conversion section configured to convert direct-current power into alternating-current power, and supply the discharge lamp with the alternating-current power via the resonant circuit section, and a control section configured to supply the discharge lamp with the alternating-current power having a first frequency and a second frequency higher than the first frequency in a lighting start period until the discharge lamp reaches a steady lighting state, the first frequency is a frequency for causing a resonance of the resonant circuit section, and the second frequency is a quasi-resonant frequency.

According to the discharge lamp drive device according to the one aspect of invention, the discharge lamp is supplied with the alternating-current power having the first frequency for causing the resonance of the resonant circuit section, and the second frequency as the quasi-resonant frequency higher than the first frequency. Therefore, the load on the resonant circuit section, namely the voltage and the current in the resonant circuit section, can be reduced compared to the case of supplying the discharge lamp with the alternating-current power having the first frequency. Thus, the heat generation of the resonant circuit section can be reduced, and the elements of the discharge lamp drive device can be inhibited from being damaged.

Further, since the resonant circuit section is set to the quasi-resonant state by supplying the discharge lamp with the alternating-current power having the second frequency, the voltage in the resonant circuit section can be made relatively high although lower than in the resonant state. Thus, even in the case in which the discharge lamp is put off, it is easy to relight the discharge lamp, and as a result, it is possible to inhibit the lighting performance of the discharge lamp from degrading.

As described hereinabove, according to the discharge lamp drive device according to the one aspect of the invention, when lighting the discharge lamp, it is possible to inhibit the lighting performance from degrading while inhibiting the damage of the elements of the discharge lamp drive device.

It may be configured such that the lighting start period alternately includes a first period in which first alternating-current power having the first frequency is supplied to the discharge lamp and a second period in which second alternating-current power having the second frequency is supplied to the discharge lamp.

According to this configuration, since the period in which the voltage in the resonant circuit section becomes a peak voltage can intermittently be disposed, the load on the resonant circuit section can be made lower.

It may be configured such that the lighting start period includes a first lighting start period and a second lighting start period disposed temporally behind the first lighting start period, the first lighting start period alternately includes a third period in which third alternating-current power having a third frequency equal to or higher than the first frequency is supplied to the discharge lamp and a fourth period in which fourth alternating-current power having a fourth frequency higher than the second frequency is supplied to the discharge lamp, the second lighting start period alternately includes the first period and the second period, and the third frequency is lower than the fourth frequency, and varies in a stepwise manner.

According to this configuration, even in the case in which the resonant frequency varies due to the individual difference of the resonant circuit section, or the resonant frequency varies due to the deterioration of the resonant circuit section, the first frequency as the resonant frequency can more accurately be obtained.

It may be configured such that the later the third period is disposed, the lower the third frequency is.

According to this configuration, it is easy to more promptly and reliably obtain the first frequency as the resonant frequency.

It may be configured such that the resonant circuit section includes a capacitor constituting an LC series resonant circuit, and in a case in which an inter-terminal voltage of the capacitor in the temporally latter third period of the third periods temporally adjacent to each other is lower than the inter-terminal voltage in the temporally former third period, the control section sets the third frequency in the temporally former third period as the first frequency, and perform a transition of the lighting start period from the first lighting start period to the second lighting start period.

According to this configuration, the lighting performance of the discharge lamp can further be inhibited from degrading.

It may be configured such that the control section sets the third frequency in the third period before the temporally former third period as the second frequency.

According to this configuration, the second frequency can more appropriately be set.

It may be configured such that the resonant circuit section has just one coil.

According to this configuration, the advantage of inhibiting the lighting performance from degrading can more significantly be obtained.

A light source device according to one aspect of the invention includes a discharge lamp configured to emit light, and the discharge lamp drive device described above.

According to the light source device according to the one aspect of the invention, since anyone of the discharge lamp drive devices described above is provided, when lighting the discharge lamp, it is possible to inhibit the lighting performance from degrading while inhibiting the damage of the elements of the discharge lamp drive device.

A projector according to one aspect of the invention includes the light source device described above, a light modulation device configured to modulate light emitted from the light source device in accordance with an image signal, and a projection optical system configured to project the light modulated by the light modulation device.

According to the projector according to the one aspect of the invention, since the light source device described above is provided, it is possible to inhibit the lighting performance from degrading while inhibiting the damage of the elements of the discharge lamp drive device.

A discharge lamp drive method according to one aspect of the invention is a discharge lamp drive method for supplying alternating-current power, which includes first alternating-current power having a first frequency adapted to cause a resonance of a resonant circuit section and second alternating-current power having a second frequency higher than the first frequency, to a discharge lamp via the resonant circuit section in a lighting start period until the discharge lamp reaches a steady lighting state, the method including supplying, in the lighting start period, third alternating-current power having a third frequency equal to or higher than the first frequency and fourth alternating-current power having a fourth frequency higher than the second frequency alternately to the discharge lamp via the resonant circuit section and lowering the third frequency in a stepwise manner, setting the third frequency one step earlier as the first frequency and the third frequency two or more steps earlier as the second frequency in a case in which an inter-terminal voltage of a capacitor in the resonant circuit section in supplying the discharge lamp with the third alternating-current power decreases, and supplying the first alternating-current power and the second alternating-current power alternately to the discharge lamp via the resonant circuit section.

According to the discharge lamp drive method according to the one aspect of the invention, it is possible to inhibit the lighting performance from degrading while inhibiting the damage of the elements of the discharge lamp drive device.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a projector according to an embodiment of the invention will be explained with reference to the accompanying drawings.

It should be noted that the scope of the invention is not limited to the embodiment hereinafter described, but can arbitrarily be modified within the technical idea or the technical concept of the invention. Further, in the following drawings, in order to make each constituent easy to understand, each of the structures is made different from the actual structure from each other in scale size, number, and so on in some cases.

Figure 1:
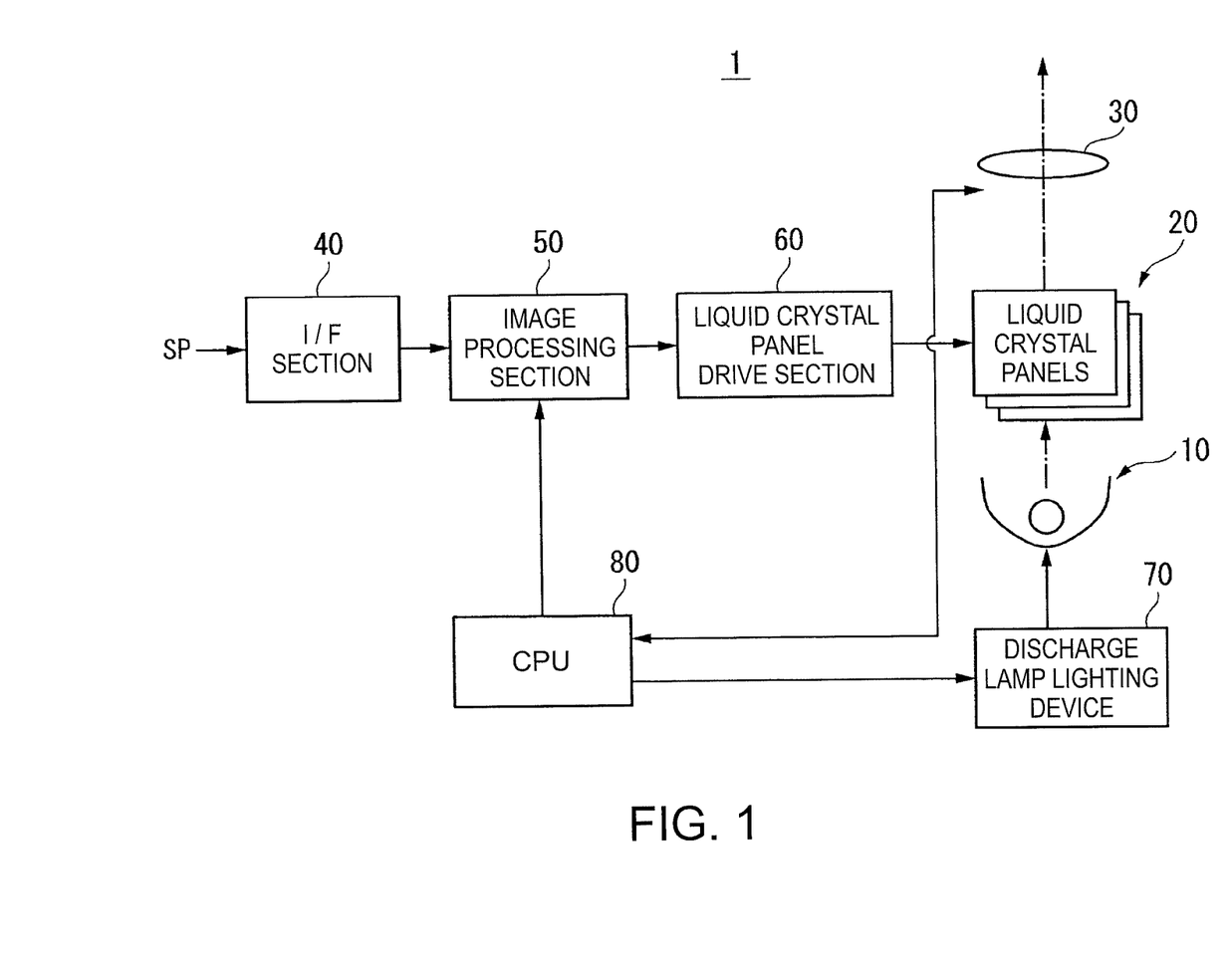
FIG. 1 is a block diagram showing an example of a functional configuration of a projector according to an embodiment of the invention.

FIG. 1 is a block diagram showing an example of a functional configuration of the projector 1 according to the present embodiment. As shown in FIG. 1, the projector 1 according to the present embodiment is provided with a discharge lamp 10, one or more liquid crystal panels (light modulation devices) 20, a projection optical system 30, an interface (I/F) section 40, an image processing section 50, a liquid crystal panel drive section 60, a discharge lamp lighting device (a discharge lamp drive device) 70, and a CPU (central processing unit) 80. In the present embodiment, the discharge lamp 10 and the discharge lamp lighting device 70 constitute a light source device. In other words, the projector 1 is provided with a light source device.

The discharge lamp 10 emits light. The discharge lamp 10 is used as a light source of the projector 1. The discharge lamp 10 is, for example, a high-pressure mercury lamp using arc discharge in the present embodiment. The discharge lamp 10 is not particularly limited, but other arbitrary discharge lamps such as a metal halide lamp or a xenon lamp can also be used.

The liquid crystal panels 20 are for modulating and then transmitting irradiation light from the discharge lamp 10 in accordance with an image signal. The number of liquid crystal panels 20 is not particularly limited.

The projection optical system 30 is for projecting transmitted light, which has been transmitted through the liquid crystal panels 20, on a screen (not shown).

The interface section 40 is for converting an image signal SP input from a personal computer or the like not shown into image data having a format, which can be processed by the image processing section 50.

The image processing section 50 is for performing a variety of types of image processing such as a luminance adjustment and a balance adjustment on the image data supplied from the interface section 40.

The liquid crystal panel drive section 60 is for driving the liquid crystal panels 20 based on the image data, on which the image processing has been performed by the image processing section 50.

The CPU 80 is for controlling the image processing section 50 and the projection optical system 30 in accordance with the operation of the operation button (not shown) provided to the remote controller (not shown) and the main body of the projector 1. In the present embodiment, the CPU 80 has a function of instructing the discharge lamp lighting device 70 to light the discharge lamp 10 when, for example, the user operates a power switch (not shown) of the projector 1.

The projector 1 according to the present embodiment can be a transmissive projector or a reflective projector. Here, "transmissive" denotes that the liquid crystal light valve including the liquid crystal panel 20 and so on is a type of transmitting the light. Further, "reflective" denotes that the liquid crystal light valve is a type of reflecting the light. It should be noted that the light modulation device is not limited to the liquid crystal panel or the like, but can also be a light modulation device using, for example, micro-mirrors.

Figure 2:
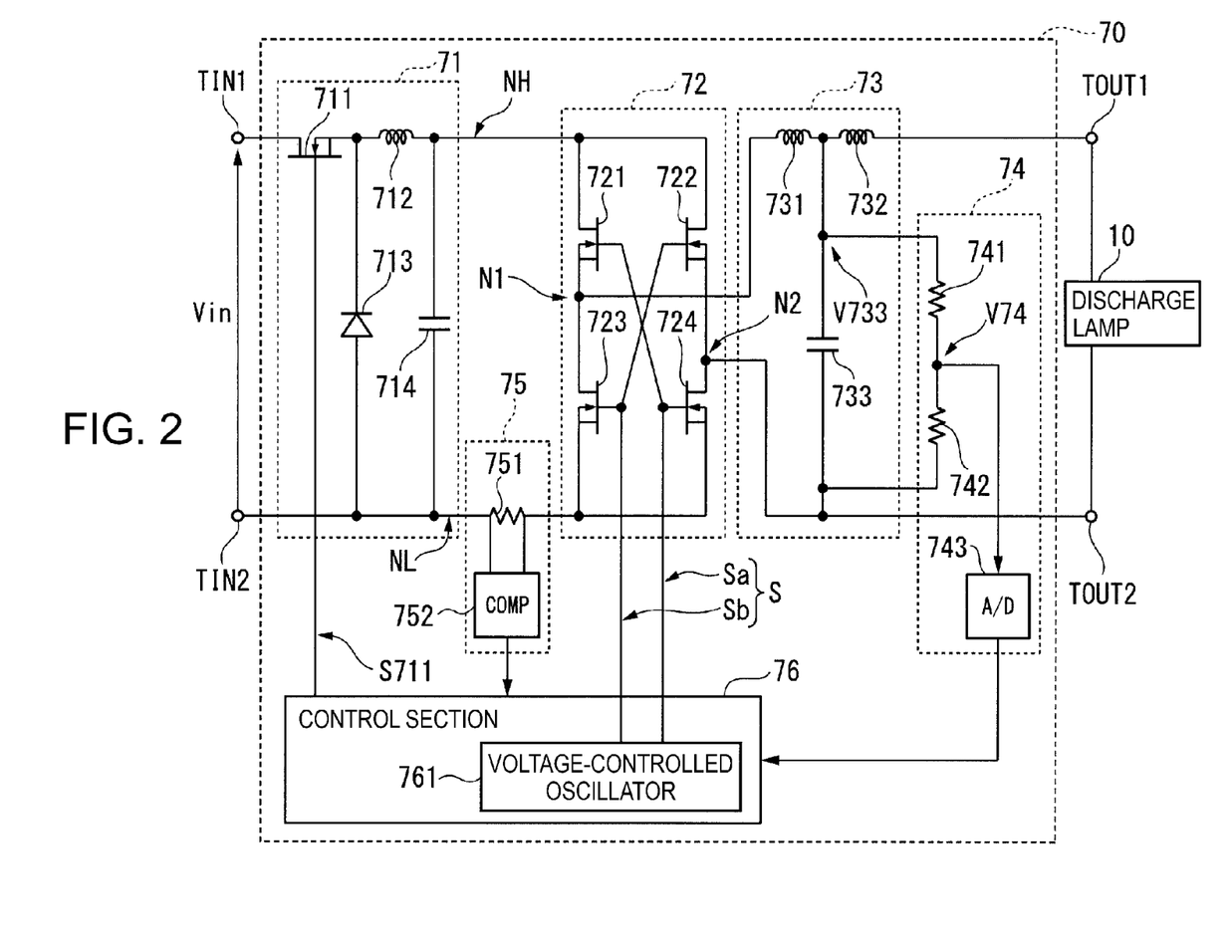
FIG. 2 is a block diagram showing an example of a functional configuration of a discharge lamp lighting device provided to the projector according to the present embodiment.

FIG. 2 is a diagram showing an example of a functional configuration of the discharge lamp lighting device 70.

The discharge lamp lighting device 70 is provided with a down chopper section 71, a power conversion section 72, a resonant circuit section 73, a voltage detection section 74, a lighting detection section 75, and a control section 76.

The down chopper section 71 is for converting direct-current power, which has a voltage Vin applied from a direct-current power supply (not shown) between input terminals TIN1 and TIN2, into direct-current power having a predetermined voltage.

The down chopper section 71 is provided with an n-channel field effect transistor 711, a choke coil 712, a diode 713, and a capacitor 714. According to the down chopper section 71, by chopping the current flowing through the n-channel field effect transistor 711 based on a control signal S711 supplied from the control section 76, direct-current power having a desired output voltage corresponding to the duty ratio of the control signal S711 is obtained. In the present embodiment, the output voltage of the down chopper section 71 is, for example, 380 V, but the invention is not limited to this voltage value.

It should be noted that the down chopper section 71 is not an essential constituent of the projector 1 according to the present embodiment, and can therefore be eliminated.

The power conversion section 72 converts the direct-current power supplied from the down chopper section into alternating-current power, and then supplies the discharge lamp 10 with the alternating-current power via the resonant circuit section 73. The power conversion section 72 is a full-bridge circuit provided with, for example, n-channel field effect transistors 721, 722, 723, and 724.

The respective drains of the n-channel field effect transistors 721, 722 are connected to a high potential node NH, and the high potential node NH is connected to the input terminal TINT via the n-channel field effect transistor 711 and the choke coil 712, which constitute the down chopper section 71. The respective sources of the n-channel field effect transistors 721, 722 are connected to the respective drains of then-channel field effect transistors 723, 724. The respective sources of the n-channel field effect transistors 723, 724 are connected to a low potential node NL, which is connected to the input terminal TIN2 via a resistor 751 constituting the lighting detection section 75 described later.

The gate of the n-channel field effect transistor 721 and the gate of the n-channel field effect transistor 724 are supplied with a control signal Sa from the control section 76.

The gate of the n-channel field effect transistor 722 and the gate of the n-channel field effect transistor 723 are supplied with a control signal Sb, which corresponds to an inversion signal of the control signal Sa, from the control section 76.

In the present embodiment, a connection section between the source of the n-channel field effect transistor 721 and the drain of the n-channel field effect transistor 723 is referred to as one output node N1 of the power conversion section 72. A connection section between the source of the n-channel field effect transistor 722 and the drain of the n-channel field effect transistor 724 is referred to as the other output node N2 of the power conversion section 72.

It is arranged that the pair of n-channel field effect transistors 722, 723 and the pair of n-channel field effect transistors 721, 724 perform switching in a complementary manner based on the control signals S (Sa, Sb) supplied from the control section 76 to thereby output the voltages of 380 V and 0 V from the respective output nodes N1, N2 in a complementary manner. In other words, due to the switching operation of these n-channel field effect transistors 721, 722, 723, and 724, the power conversion section 72 converts the direct-current power into the alternating-current power. The alternating-current power converted by the power conversion section 72 is, for example, a rectangular wave. The frequency of the alternating-current power coincides with a clock frequency of the control signals S supplied from the control section 76.

The resonant circuit section 73 is a device functioning as an igniter for generating a high voltage exceeding a discharge starting voltage (a breakdown voltage) of the discharge lamp 10. The resonant circuit section 73 is provided with two coils 731, 732 magnetically coupled to each other, and a capacitor 733. To the resonant circuit section 73, there is connected the discharge lamp 10 via output terminals TOUT1, TOUT2. In other words, the resonant circuit section 73 is connected to the discharge lamp 10.

One end of the coil 731 is connected to the output node N1 of the power conversion section 72, the other end of the coil 731 is connected to one end of the coil 732, and the other end of the coil 732 is connected to the output terminal TOUT1. To a connection node between the coil 731 and the coil 732, there is connected one electrode of the capacitor 733. The other electrode of the capacitor 733 is connected to the output node N2 of the power conversion section 72, and at the same time connected to the output terminal TOUT2.

In the present embodiment, the coil 731 and the capacitor 733 constituting the resonant circuit section 73 form an LC series resonant circuit. In the present embodiment, basically, the resonant frequency of the LC series resonant circuit appears as the resonant frequency (a first frequency) fr inherent in the resonant circuit section 73. The resonant frequency of the LC series resonant circuit is determined by the coil 731 and the capacitor 733.

In the present embodiment, the resonant frequency fr is set to, for example, 390 kHz. Therefore, if the frequency of the alternating-current power supplied from the power conversion section 72 coincides with resonant frequency fr of the resonant circuit 73 to make the LC series resonant circuit constituted by the coil 731 and the capacitor 733 get into the resonant state, the inter-terminal voltage V733 of the capacitor 733 reaches, in principle, an infinite value. Thus, the high voltage necessary to start the discharge of the discharge lamp 10 can be obtained by the resonant circuit section 73.

It should be noted that in the following explanation, the inter-terminal voltage V733 of the capacitor 733 is referred to as a resonant output voltage V733 in some cases.

It should be noted that since a third-order resonance mode is used in the present embodiment as described later, the frequency of the alternating-current power, which is supplied from the power conversion section 72 when the resonant circuit section 73 gets into the resonant state, is the frequency a third as high as the resonant frequency inherent in the resonant circuit section 73. In other words, in the case of using an N-order resonance mode, the frequency of the alternating-current power, which is supplied from the power conversion section 72 when the resonant circuit section 73 gets into the resonant state, becomes the frequency an N-th as high as the resonant frequency of the resonant circuit section 73.

However, even in the case in which the LC series resonant circuit described above gets into the resonant state, if a resistance component of the n-channel field effect transistors 721, 722, 723, and 724 constituting the power conversion section 72 or a wiring impedance exists, the inter-terminal voltage V733 of the capacitor 733 fails to exceed the level of no lower than 1 kV and not higher than 1.5 kV, approximately, and it becomes unachievable to obtain the high voltage necessary to start the discharge of the discharge lamp 10. Therefore, in the present embodiment, the resonant circuit section 73 is provided with the coil 732 magnetically coupled to the coil 731 constituting the LC series resonant circuit, and amplifies the inter-terminal voltage V733 of the capacitor 733 in accordance with the turn ratio between the coil 731 and the coil 732 to thereby finally generate the high voltage of several kV necessary to start the discharge of the discharge lamp 10.

Further, in the present embodiment, the resonant circuit section 73 uses a so-called third-order resonance mode to thereby resonate at the frequency three times as high as the frequency of the alternating-current power supplied from the power conversion section 72 in a lighting start period P which is a period until the discharge lamp 10 reaches a steady lighting state. Here, the third-order resonance mode uses the vibrational component of the waveform of the alternating-current power output from the power conversion section 72. In principle, the power conversion section 72 outputs a rectangular wave as the waveform of the alternating-current power, and the waveform includes a harmonic component. Using the harmonic component, the resonant circuit section 73 is designed to resonate at a frequency three times as high as the frequency of the alternating-current power output from the power conversion section 72 in the lighting start period P. In other words, the resonant frequency of the resonant circuit section 73 is set to the frequency three times as high as the frequency of the alternating-current power output from the power conversion section 72 in the lighting start period P.

In the present embodiment, the resonant frequency of the resonant circuit section 73 is set to, for example, 390 kHz, and when the alternating-current power at 130 kHz is supplied from the power conversion section 72, the resonant circuit section 73 resonates at 390 kHz three times as high as the frequency due to the third-order resonance mode. By using the third-order resonance mode in such a manner as described above, the resonant frequency of the resonant circuit section 73 can be set relatively high with respect to the frequency of the alternating-current power described above. Therefore, compared to the case of not using the third-order resonance mode, the values of the respective inductance components of the coils 731, 732 and the capacitance component of the capacitor 733 constituting the resonant circuit section 73 can be set lower. Thus, it becomes possible to configure the resonant circuit section 73 small in size.

Therefore, the resonant circuit section 73 can be configured smaller in size by matching the resonant frequency of the resonant circuit section 73 with the frequency (390 kHz) three times as high as the frequency (130 kHz) of the alternating-current power output from the power conversion section 72 in the lighting start period P using the third-order resonance mode rather than by matching the resonant frequency of the resonant circuit section 73 with the frequency of the alternating-current power described above. Further, even in the case of setting the resonant frequency of the resonant circuit section 73 high, the frequency of the alternating-current power output from the power conversion section 72 can be set relatively low by using the third-order resonance mode. Therefore, the switching operation in the high voltage region by the power conversion section 72 can be stabilized, and thus, it becomes possible to reduce the burden on the power conversion section 72.

The frequency of the alternating-current power described above in the case of causing the resonance of the resonant circuit section 73 in such a third-order resonance mode has an equivalent technical sense to the resonant frequency inherent in the resonant circuit section 73 in terms of bringing the resonant circuit section 73 into the resonant state, and can apparently be treated as the resonant frequency of the resonant circuit section 73. Therefore, the frequency of the alternating-current power of the power conversion section 72 for causing the resonance of the resonant circuit section 73 in the third-order resonance mode is hereinafter referred to as a "resonant frequency fr of the resonant circuit section 73," or simply as a "resonant frequency fr." The resonant frequency (the first frequency) fr is stored in, for example, a storage section not shown provided to the control section 76.

It should be noted that in the present embodiment, the third-order resonance mode is not necessarily an essential element, and in the case of not using the third-order resonance mode, namely the case of using a first-order resonance mode, the resonant frequency fr coincides with the resonant frequency inherent in the resonant circuit section 73. Further, although in the present embodiment, the case in which the resonant circuit section 73 resonates in the third-order resonance mode is cited as an example, the third-order resonance mode is not a limitation, and it is also possible to assume that the resonant circuit section 73 resonates using an N-order resonance mode (N denotes an odd number). In this case, the resonant frequency fr is the frequency at which the resonance of the resonant circuit section 73 is caused in the arbitrary N-order resonance mode including the resonance frequency inherent in the resonant circuit section 73, and is defined as the frequency of the alternating-current power supplied from the power conversion section 72 or as the frequency of the control signals S.

Figure 3:
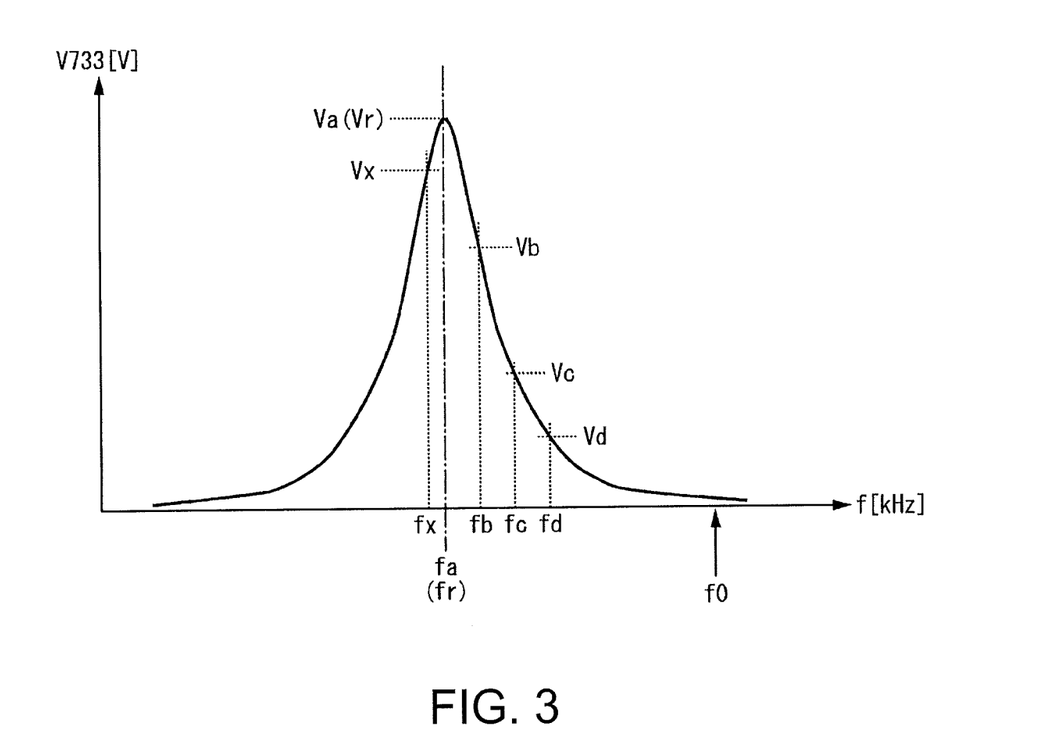
FIG. 3 is a graph showing a frequency dependency of a resonant output voltage of a resonant circuit in the present embodiment.

FIG. 3 is a graph showing a frequency dependency (resonance characteristics) of the resonant output voltage V733 of the resonant circuit section 73. In FIG. 3, the vertical axis represents the inter-terminal voltage V733, and the horizontal axis represents the frequency f. As shown in FIG. 3, the resonant output voltage V733 in the resonant circuit section 73 shows a peak voltage Vr (the maximum value) when the frequency f coincides with the resonant frequency fr of the resonant circuit section 73.

It should be noted that as described above, in the present embodiment, since the third-order resonance mode is adopted, the resonant frequency inherent in the resonant circuit section 73 is three times as high as the resonant frequency fr. The resonant output voltage V733 in the resonant circuit section 73 shows the peak voltage Vr when the frequency of a harmonic, which is included in the alternating-current power with the frequency f supplied to the resonant circuit section 73, coincides with the resonant frequency inherent in the resonant circuit section 73.

The voltage detection section 74 is for detecting the inter-terminal voltage V733 of the capacitor 733 constituting the resonant circuit section 73 described above. The voltage detection section 74 is provided with resistors 741, 742 connected in series between the terminals of the capacitor 733, and an analog/digital (A/D) conversion section 743.

The resistors 741, 742 are for dividing the inter-terminal voltage (the resonant output voltage) V733 of the capacitor 733 of the resonant circuit section 73 to obtain a voltage V74 corresponding to the resistor ratio thereof. The analog/digital conversion section 743 is for converting the voltage V74 thus obtained by the voltage division into digital data and then outputting the digital data. In the present embodiment, the voltage V74 is a voltage of an intermediate stage generated for matching the resonant output voltage V733 with the input characteristic of the analog/digital conversion section 743. Therefore, the digital data output by the analog/digital conversion section 743 represents the value of the resonant output voltage V733, and the resonant output voltage V733 detected by the voltage detection section 74 is supplied to the control section 76.

The lighting detection section 75 is for detecting lighting/non-lighting of the discharge lamp 10. The lighting detection section 75 is provided with the resistor 751 and a comparator section 752.

The resistor 751 is connected between the input terminal TIN2 and the source of each of the n-channel field effect transistors 723, 724 constituting the power conversion section 72. The inter-terminal voltage (drop voltage) of the resistor 751 is input to the comparator section 752.

The comparator section 752 detects the current flowing through the discharge lamp 10 based on the inter-terminal voltage of the resistor 751. The comparator section 752 compares the current thus detected and a predetermined voltage value corresponding to the current, which flows through the resistor 751 when the discharge lamp 10 lights, with each other to thereby detect lighting/non-lighting of the discharge lamp 10. Specifically, the lighting detection section 75 detects lighting of the discharge lamp 10 in the case in which, for example, the inter-terminal voltage of the resistor 751 is equal to or higher than a predetermined voltage value, and detects non-lighting of the discharge lamp 10 in the case in which the inter-terminal voltage of the resistor 751 falls below the predetermined voltage value. In the case of detecting lighting of the discharge lamp 10, the lighting detection section 75 outputs a signal representing the detection of lighting of the discharge lamp 10 to the control section 76.

The control section 76 is for controlling the respective switching operations of the down chopper section 71 described above and the power conversion section 72. In the present embodiment, the control section 76 controls the frequency of the alternating-current power supplied to the resonant circuit section 73 in the lighting start period P.

The control section 76 is provided with a voltage-controlled oscillator 761. The voltage-controlled oscillator 761 is for outputting the signal with the frequency corresponding to the input voltage (not shown) as the control signal S. The signal defining the input voltage of the voltage-controlled oscillator 761 is generated in the control section 76 so that the switching operation described later of the power conversion section 72 can be obtained.

The control of the control section 76 according to the present embodiment will hereinafter be explained in detail.

Figure 4:
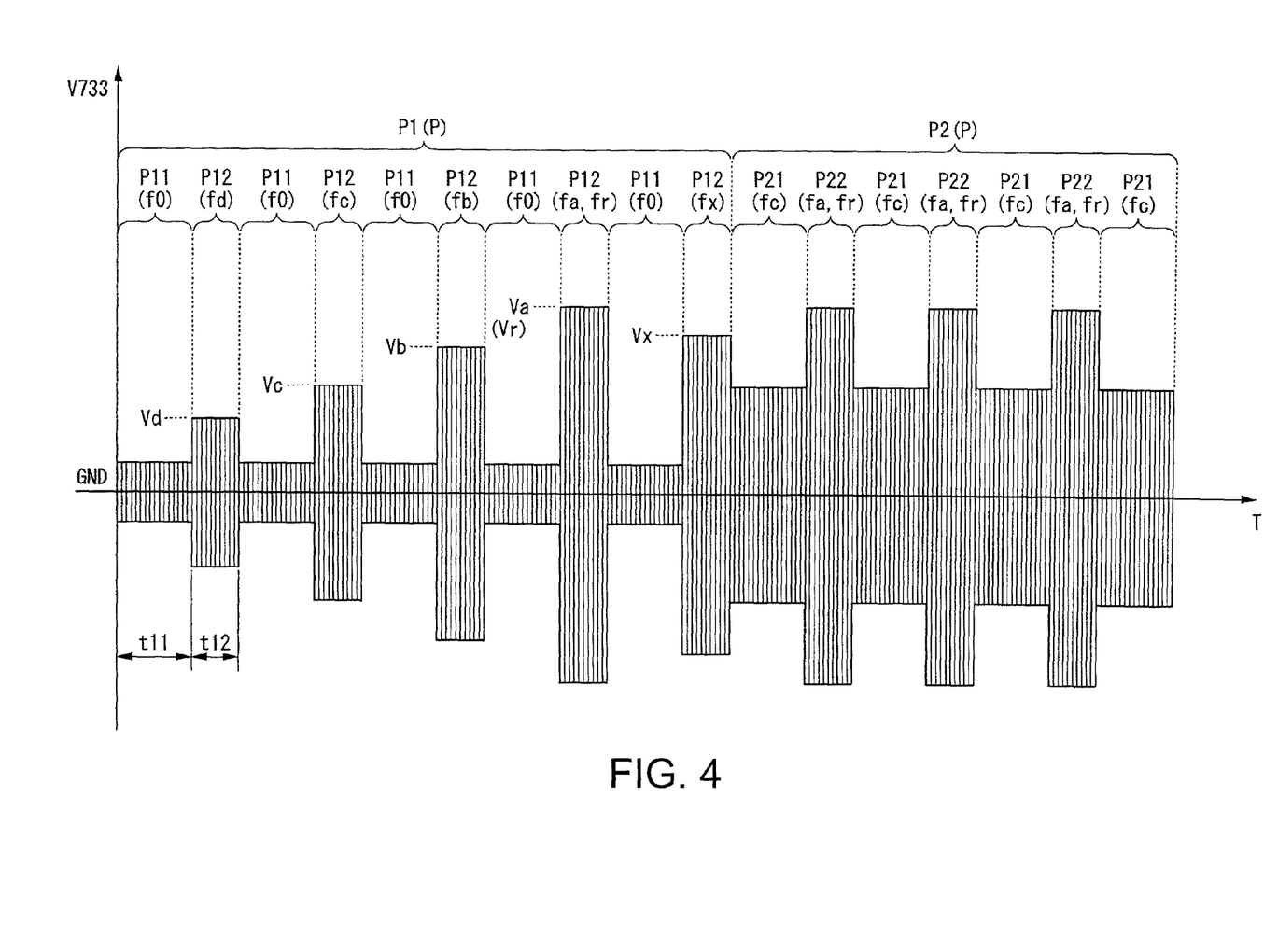
FIG. 4 is a schematic diagram showing a variation of the resonant output voltage of the resonant circuit section in the present embodiment.

FIG. 4 is a schematic diagram showing a variation of the resonant output voltage V733 of the resonant circuit section 73 in the lighting start period P of the present embodiment. In FIG. 4, the vertical axis represents the resonant output voltage V733, and the horizontal axis represents the time T.

As shown in FIG. 4, in the present embodiment, the lighting start period P includes a first lighting start period P1 and a second lighting start period P2. The first lighting start period P1 alternately includes first low voltage periods (fourth periods) P11 and first high voltage periods (third periods) P12.

The low voltage periods P11 are each a period in which the alternating-current power (fourth alternating-current power) having a basic frequency (fourth frequency) f0 is supplied to the discharge lamp 10. As shown in FIG. 3, the basic frequency f0 is higher than a quasi-resonant frequency (second frequency) fc described later. As shown in FIG. 4, in the present embodiment, the basic frequency f0 has a constant value. In other words, in all of the low voltage periods P11 included in the first lighting start period P1, the frequency of the alternating-current power supplied to the discharge lamp 10 is constant.

The basic frequency f0 is, for example, not lower than 145 kHz and not higher than 170 kHz. By setting the basic frequency in such a manner, it is easy to make the basic frequency f0 sufficiently higher than the resonant frequency fr. Therefore, in the first lighting start period P1, the switching loss of the power conversion section 72 can be reduced. As shown in FIG. 3, the resonant output voltage V733 at the basic frequency f0 is relatively low.

The high voltage periods P12 are each a period in which the alternating-current power (third alternating-current power) having a drive frequency (third frequency) is supplied to the discharge lamp 10. The drive frequency is equal to or higher than the resonant frequency (the first frequency) fr, and is lower than the basic frequency f0. The drive frequency in the high voltage periods P12 varies in a stepwise manner. In the example shown in FIG. 4, the value of the drive frequency varies by the high voltage period P12 in the order of fd, fc, fb, fa, and fx. It should be noted that the number of drive frequencies is not limited to this example, but can arbitrarily be increased.

The drive frequencies fd, fc, fb, fa, and fx are in a descending order. In other words, the later the high voltage period P12 is disposed, the lower the drive frequency is.

The drive frequencies fd, fc, fb, fa, and fx are generated with differences of a constant frequency step. In other words, the control section 76 varies the frequency f of the alternating-current power supplied from the power conversion section 72 in a stepwise manner with the constant frequency step. It should be noted that the drive frequencies are not limited to this example, but the frequency step can be set smaller in the vicinity of the resonant frequency fr, for example.

In the example shown in FIGS. 3 and 4, the drive frequency fa is equal to, for example, the resonant frequency fr. Therefore, as shown in FIG. 3, the resonant output voltage Va, which is output when the value of the drive frequency is the drive frequency fa, is the peak voltage Vr of the resonant output voltage V733. The closer the value of the drive frequency is to the drive frequency fa, the higher the resonant output voltage V733 is.

In other words, the resonant output voltage Vd at the drive frequency fd, the resonant output voltage Vc at the drive frequency fc, the resonant output voltage Vb at the drive frequency fb, and the resonant output voltage Va at the drive frequency fa are in an ascending order. The resonant output voltage Vx at the drive frequency fx is lower than the resonant output voltage Va.

In the present embodiment, the drive frequencies fa through fd for generating the relatively high resonant output voltage V733 are referred to as a quasi-resonant frequency.

It should be noted that in the specification, the quasi-resonant frequency of the resonant circuit section includes a frequency at which the voltage capable of causing the breakdown between the electrodes of the discharge lamp is applied. Once the breakdown occurs in the discharge lamp, the voltage capable of causing the breakdown between the electrodes of the discharge lamp lowers for a while.

The length t11 of the low voltage period P11 and the length t12 of the high voltage period P12 are each arbitrarily set in a range in which the breakdown occurs between the electrodes of the discharge lamp 10 in the lighting start period P to light the discharge lamp 10.

The length t11 of the low voltage period P11 can be set to, for example, 6 ms. The length t12 of the high voltage period P12 can be set to, for example, 2 ms. By setting the length t11 of the low voltage period P11 and the length t12 of the high voltage period P12 as described above, it is possible to reduce the load on the discharge lamp 10 while reducing the power consumption.

The second lighting start period P2 is disposed temporally behind the first lighting start period P1. The second lighting start period P2 alternately includes quasi-resonant periods (second periods) P21 and resonant periods (first periods) P22. In other words, the lighting start period P alternately includes the quasi-resonant periods P21 and the resonant periods P22.

The quasi-resonant periods P21 are each a period in which the alternating-current power (first alternating-current power) having the quasi-resonant frequency (the second frequency) higher than the resonant frequency (the first frequency) fr is supplied to the discharge lamp 10. In the present embodiment, the quasi-resonant frequency in the quasi-resonant period P21 is a constant value. In other words, in all of the quasi-resonant periods P21 included in the second lighting start period P2, the frequency of the alternating-current power supplied to the discharge lamp 10 is constant.

The value of the quasi-resonant frequency supplied to the discharge lamp 10 in the quasi-resonant periods P21 in the present embodiment is, for example, fc. Specifically, in the present embodiment, the quasi-resonant frequency in the quasi-resonant periods P21 is the drive frequency fc in the high voltage period P12 three periods before the high voltage period P12 disposed immediately before the second lighting start period P2. The length of the quasi-resonant period P21 is roughly equal to, for example, the length t11 of the low voltage period P11.

The quasi-resonant frequency in the quasi-resonant periods P21 is set to a frequency at which, for example, the resonant output voltage V733 slightly higher than the resonant output voltage V733 capable of causing the breakdown between the electrodes of the discharge lamp 10 is applied between the electrodes. As described above, the resonant output voltage V733 necessary for the breakdown lowers for a while once the breakdown has occurred in the discharge lamp 10. The quasi-resonant frequency in the quasi-resonant periods P21 is set to a frequency at which, for example, the resonant output voltage V733 slightly higher than the resonant output voltage V733 thus lowered is applied between the electrodes. The resonant output voltage V733 necessary for the breakdown thus lowered is, for example, 400 V.

The resonant periods P22 are each a period in which the alternating-current power (first alternating-current power) having the resonant frequency fr is supplied to the discharge lamp 10. In the present embodiment, the resonant frequency in the resonant period P22 is a constant value. In other words, in all of the resonant periods P22 included in the second lighting start period P2, the frequency of the alternating-current power supplied to the discharge lamp 10 is constant.

As described above, in the present embodiment, the drive frequency fa is equal to the resonant frequency fr. Specifically, in the present embodiment, the resonant frequency fr is the drive frequency fa in the high voltage period P12 one period before the high voltage period P12 disposed immediately before the second lighting start period P2. The length of the resonant period P22 is roughly equal to, for example, the length t12 of the high voltage period P12.

Figure 5:
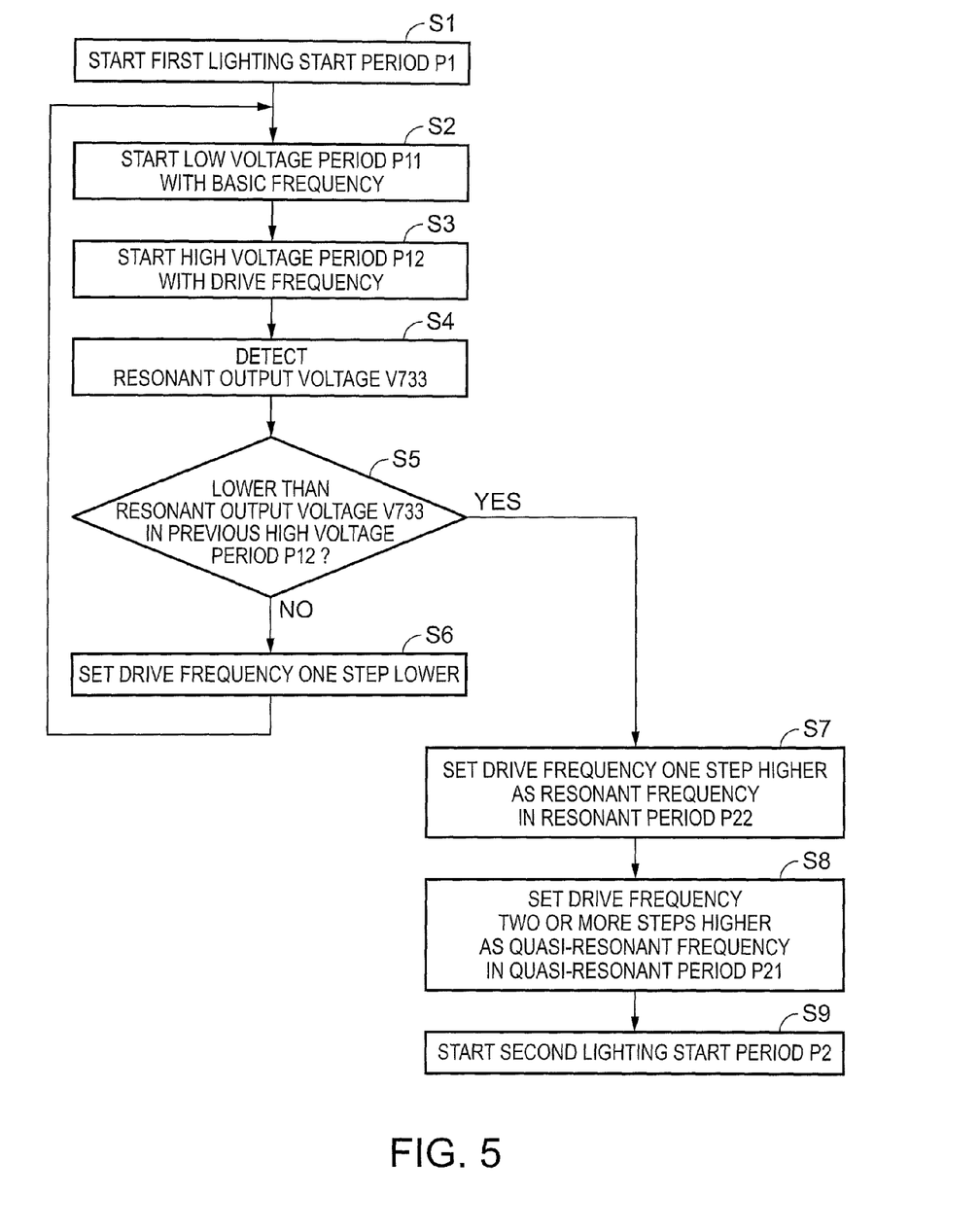
FIG. 5 is a flowchart showing an example of a flow of a lighting action performed by a control section in the present embodiment.

FIG. 5 is a flowchart showing a part of a flow of the lighting action performed by the control section 76 in the present embodiment.

Firstly, if an operation of the power switch (not shown) is performed by the user, a system control section (not shown) formed of the CPU 80 of the projector 1 instructs the discharge lamp lighting device 70 to light the discharge lamp 10.

When receiving the instruction from the system control section described above, the control section 76 of the discharge lamp lighting device 70 makes the down chopper section 71 start the switching action using the control signal S711. Thus, as shown in FIG. 5, the first lighting start period P1 of the lighting start period P is started (step S1).

In the first lighting start period P1, the control section 76 starts (step S2) the low voltage period P11 with the basic frequency f0. Then, after the low voltage period P11 ends, the control section 76 starts (step S3) the high voltage period P12 with the drive frequency, the drive frequency fd in the example shown in FIG. 4.

In the high voltage period P12, the control section 76 detects (step S4) the resonant output voltage V733 using the voltage detection section 74. Then, the control section 76 determines (step S5) whether or not the resonant output voltage V733 thus detected is lower than the resonant output voltage V733 in the previous high voltage period P12. In the case in which the resonant output voltage V733 thus detected is equal to or higher than the resonant output voltage V733 in the previous high voltage period P12 (NO in the step S5), the control section 76 set (step S6) the drive frequency one step lower. In the case in which, for example, the value of the drive frequency is fd, the control section 76 sets the value of the drive frequency to fc lower than fd.

It should be noted that in the case in which the high voltage period P12 in which the resonant output voltage V733 is detected is the high voltage period P12 disposed first in the first lighting start period P1, the drive frequency is set (step S6) one step lower similarly to the case in which the resonant output voltage V733 thus detected is equal to or higher than the resonant output voltage V733 in the previous high voltage period P12.

The control section 76 sets the value of the drive frequency one step lower, and then starts the low voltage period P11 and the high voltage period P12 again. As described above, the control section 76 alternately repeats the low voltage period P11 and the high voltage period P12 while lowering the drive frequency in the high voltage period P12 in a stepwise manner until the resonant output voltage V733 in the high voltage period P12 becomes lower than the resonant output voltage V733 in the previous high voltage period P12.

In the case in which the resonant output voltage V733 detected in the high voltage period P12 is lower than the resonant output voltage in the previous high voltage period P12 (YES in the step S5), the control section 76 sets (step S7) the resonant frequency (the first frequency) fr in the resonant period P22 to a drive frequency one step higher, and sets (step S8) the quasi-resonant frequency (the second frequency) in the quasi-resonant period P21 to a drive frequency two or more steps higher. It should be noted that it is also possible for the steps S7, S8 to be executed at the same time, or to be executed in reverse order.

In the example shown in FIG. 4, in the case in which the drive frequency in the high voltage period P12 becomes fx, the resonant output voltage V733 becomes Vx lower than Va, which is the resonant output voltage V733 in the previous high voltage period P12. Therefore, the resonant frequency fr is set to the drive frequency fa, which is one step higher than the drive frequency fx. Further, the quasi-resonant frequency is set to the drive frequency fc, which is three steps higher than the drive frequency fx, in, for example, the example shown in FIG. 4.

It should be noted that the case in which the resonant output voltage V733 detected in the high voltage period P12 is lower than the resonant output voltage V733 in the previous high voltage period P12 corresponds to the case in which in the high voltage periods P12 temporally adjacent to each other, the resonant output voltage V733 in the temporally latter high voltage period P12 is lower than the resonant output voltage V733 in the temporally former high voltage period P12. In other words, the control section 76 sets the resonant frequency (the first frequency) fr to the drive frequency (the third frequency) in the temporally former high voltage period P12 out of the high voltage periods P12 temporally adjacent to each other, and sets the quasi-resonant frequency (the second frequency) to the drive frequency (the third frequency) in the high voltage period P12 before the temporally former high voltage period P12 out of the high voltage periods P12 temporally adjacent to each other.

Subsequently, the control section 76 makes the transition of the lighting start period P from the first lighting start period P1 to the second lighting start period P2. Thus, the second lighting start period P2 is started (step S9). Subsequently, the control section 76 alternately repeats the quasi-resonant period P21 and the resonant period P22 in the second lighting start period P2 during the period until the steady lighting state is reached.

By rephrasing the control by the control section 76 described above as a discharge lamp drive method, the discharge lamp drive method according to the present embodiment is a discharge lamp drive method for supplying the alternating-current power including the first alternating-current power having the resonant frequency fr (the first frequency) for causing the resonance of the resonant circuit section 73 and the second alternating-current power having the quasi-resonant frequency (the second frequency) higher than the resonant frequency fr to the discharge lamp 10 via the resonant circuit section 73 in the lighting start period P until the discharge lamp 10 reaches the steady lighting state, and is characterized by including the steps of alternately supplying the third alternating-current power having the drive frequency (the third frequency) equal to or higher than the resonant frequency fr and the fourth alternating-current power having the basic frequency (the fourth frequency) f0 higher than the quasi-resonant frequency to the discharge lamp 10 via the resonant circuit section 73 and lowering the drive frequency in a stepwise manner in the lighting start period P, and setting the drive frequency one step earlier as the resonant frequency fr, setting the drive frequency two or more steps earlier as the quasi-resonant frequency, and alternately supplying the first alternating-current power and the second alternating-current power to the discharge lamp 10 via the resonant circuit section 73 in the case in which the resonant output voltage V733, which is the inter-terminal voltage of the capacitor 733 in the resonant circuit section 73 when supplying the discharge lamp 10 with the third alternating-current power, is lowered.

According to the present embodiment, in the second lighting start period P2, the alternating-current power having the resonant frequency fr for causing the resonance of the resonant circuit section 73 and the alternating-current power having the quasi-resonant frequency higher than the resonant frequency fr are supplied to the discharge lamp 10. Therefore, in the quasi-resonant period P21 in which the alternating-current power having the quasi-resonant frequency is supplied, the load on the resonant circuit section 73, namely the resonant output voltage V733 and the current flowing through the resonant circuit section 73, can be made lower than those in the case in which the alternating-current power having the resonant frequency fr is supplied to the discharge lamp 10. Thus, the heat generation of the resonant circuit section 73 can be reduced, and the elements of the discharge lamp lighting device 70 can be inhibited from being damaged.

Further, in the quasi-resonant period P21, since the drive frequency becomes the quasi-resonant frequency, the resonant output voltage V733 can be made relatively high although lower compared to the resonant output voltage V733 in the resonant state. Thus, even in the case in which the discharge lamp 10 is put off in the quasi-resonant period P21, it is easy to relight the discharge lamp 10, and as a result, it is possible to inhibit the lighting performance of the discharge lamp 10 from degrading.

As described hereinabove, according to the present embodiment, when lighting the discharge lamp 10, it is possible to inhibit the lighting performance from degrading while inhibiting the damage of the elements the discharge lamp lighting device 70.

Further, if the state in which the resonant output voltage V733 is high continues for a certain amount of time, the voltage necessary to cause the breakdown in the discharge lamp 10 drops. According to the present embodiment, since the alternating-current power having the quasi-resonant frequency is supplied to the discharge lamp 10, it is easy to keep the resonant output voltage V733 in the high state. Thus, it is possible to more promptly light the discharge lamp 10.

Further, according to the present embodiment, since the resonant output voltage V733 can be made higher due to the drive method of the discharge lamp 10, it is possible to deal with the discharge lamp 10 requiring the higher resonant output voltage V733 without changing the circuit configuration of the resonant circuit section 73.

Further, if the quasi-resonant frequency in the quasi-resonant period P21 is lower than the resonant frequency fr, the switching loss in the power conversion section 72 increases. In contrast, according to the present embodiment, the quasi-resonant frequency in the quasi-resonant period P21 is higher than the resonant frequency fr. Therefore, the switching loss in the power conversion section 72 can be reduced.

Further, according to the present embodiment, since the resonant periods P22 and the quasi-resonant periods P21 are alternately disposed, the period in which the resonant output voltage V733 becomes the peak voltage Vr can intermittently be disposed. Thus, since the load of the resonant circuit section 73 can be made smaller, the elements of the discharge lamp lighting device 70 can further be inhibited from being damaged.

Further, according to the present embodiment, in the first lighting start period P1, the drive frequency varies in a stepwise manner by each of the high voltage periods P12. Therefore, by detecting the variation in the resonant output voltage V733 in the high voltage periods P12, the resonant frequency fr of the resonant circuit section 73 can be obtained. Thus, even in the case in which the resonant frequency fr varies due to the individual difference of the resonant circuit section 73, or the resonant frequency fr varies due to the deterioration of the resonant circuit section 73, the resonant frequency fr can more accurately be obtained. Therefore, according to the present embodiment, it is possible to inhibit the phenomenon that the alternating-current power having the resonant frequency fr fails to be supplied to the discharge lamp 10 and thus, the discharge lamp 10 fails to light in the lighting start period P. Further, since it is possible to inhibit the phenomenon that the alternating-current power having the resonant frequency fr is supplied to the discharge lamp 10 at an unintended timing, the elements of the discharge lamp lighting device 70 can be inhibited from being damaged.

Further, according to the present embodiment, the later the high voltage period P12 is disposed, the lower the drive frequency (the third frequency) is. The closer the drive frequency is to the resonant frequency fr, the higher the resonant output voltage V733 becomes. Therefore, if the drive frequency is lowered from the frequency higher than the resonant frequency fr in a stepwise manner, the resonant output voltage V733 increases until the drive frequency reaches the resonant frequency fr, and then the resonant output voltage 733 decreases when the drive frequency becomes lower than the resonant frequency fr. Thus, it is possible to identify that the drive frequency at the boundary, at which the increase and the decrease of the resonant frequency are switched, is the resonant frequency fr. Therefore, according to the present embodiment, the resonant frequency fr can promptly and more reliably be obtained.

Further, according to the present embodiment, in the case in which the resonant output voltage V733 in the temporally latter high voltage period P12 is lower than the resonant output voltage V733 in the temporally former high voltage period P12 in the high voltage periods P12 temporally adjacent to each other, the control section 76 sets the resonant frequency fr to the drive frequency in the temporally former high voltage period P12, and makes the transition of the lighting start period P from the first lighting start period P1 to the second lighting start period P2. Thus, since it is possible to light the discharge lamp 10 using the resonant frequency fr more reliably obtained in such a manner as described above, the lighting performance of the discharge lamp 10 can further be inhibited from degrading.

Further, according to the present embodiment, in the case in which the resonant output voltage V733 in the temporally latter high voltage period P12 is lower than the resonant output voltage V733 in the temporally former high voltage period P12 in the high voltage periods P12 temporally adjacent to each other, the control section 76 sets the quasi-resonant frequency in the quasi-resonant period P21 to the drive frequency in the high voltage period P12 before the temporally former high voltage period P12. Therefore, it is possible to more reliably set the frequency of the alternating-current power supplied to the discharge lamp 10 in the quasi-resonant period P21 to the quasi-resonant frequency of the resonant circuit section 73.

It should be noted that in the present embodiment, it is also possible to adopt the following configurations and methods.

In the present embodiment, it is not required for the resonant circuit section 73 to be provided with the coil 732 among the coils 731, 732. In other words, in the present embodiment, it is also possible to adopt a configuration in which the resonant circuit section 73 has one coil. In the case in which the coil 732 is not provided, it is difficult to obtain the high voltage necessary to start the discharge of the discharge lamp 10. Therefore, if the voltage and the current in the resonant circuit section 73 are made lower, it becomes more difficult to relight the discharge lamp 10 once the discharge lamp 10 is put off. Therefore, according to this configuration, the advantage of the present embodiment that the lighting performance of the discharge lamp 10 can be inhibited from degrading can more significantly be obtained.

Further, according to this configuration, since the resonant circuit section 73 includes just one coil, there is no need to isolate the coils 731, 732 from each other. Therefore, the configuration of the resonant circuit section 73 can be simplified, and thus manufacturing of the resonant circuit section 73 can be made easier. Further, the resonant circuit section 73 can be configured small in size.

Further, in the present embodiment, the frequency in the quasi-resonant period P21 can be set to either of the drive frequencies in the respective high voltage periods P12 providing the drive frequency is the frequency for generating the resonant output voltage V733 capable of making it easier to relight the discharge lamp 10, and the drive frequency is higher than the resonant frequency fr. In other words, in the example described above, the quasi-resonant frequency in the quasi-resonant period P21 can also be, for example, one of the drive frequencies fd, fb.

Further, although in the explanation described above, the power conversion section 72 is formed of the full-bridge circuit, the configuration of the power conversion section 72 is not limited to this example. In the present embodiment, it is also possible to use an arbitrary circuit configuration such as a half-bridge as the circuit configuration of the power conversion section 72 as long as the alternating-current power can be supplied to the resonant circuit section 73.

Further, although in the resonant circuit section 73 of the present embodiment, the coil 732 magnetically coupled to the coil 731 constituting the LC series resonant circuit is disposed on the one end side of the capacitor 733 similarly to the coil 731, the configuration is not limited to this example, but the coil 732 can be disposed on the other end side of the capacitor 733 in the resonant circuit section 73.

Further, in the present embodiment, the circuit configurations of the voltage detection section 74 and the lighting detection section 75 are not limited to the configuration explained above, but arbitrary circuit configurations can be used.

Further, although in the explanation described above, it is assumed that the discharge lamp lighting device 70 is a constituent of the projector 1, it is also possible to configure the discharge lamp lighting device 70 as a separate device from the projector 1.

It should be noted that the constituents explained above can arbitrarily be combined with each other within a range in which the constituents do not conflict with each other.

The entire disclosure of Japanese Patent Application No. 2015-065921, filed Mar. 27, 2015 is expressly incorporated by reference herein.

What is claimed is:

1. A discharge lamp drive device comprising:
    a resonant circuit section connected to a discharge lamp;
    a power conversion section configured to convert direct-current power into alternating-current power, and supply the discharge lamp with the alternating-current power via the resonant circuit section; and
    a control section configured to alternately supply the discharge lamp with the alternating-current power having a first frequency and a second frequency higher than the first frequency in a lighting start period until the discharge lamp reaches a steady lighting state,
    wherein the first frequency is a frequency for causing a resonance of the resonant circuit section, and
    the second frequency is a quasi-resonant frequency.

2. The discharge lamp drive device according to claim 1, wherein
    the lighting start period alternately includes a first period in which first alternating-current power having the first frequency is supplied to the discharge lamp and a second period in which second alternating-current power having the second frequency is supplied to the discharge lamp.

3. The discharge lamp drive device according to claim 2, wherein
    the lighting start period includes a first lighting start period and a second lighting start period disposed temporally behind the first lighting start period,
    the first lighting start period alternately includes a third period in which third alternating-current power having a third frequency equal to or higher than the first frequency is supplied to the discharge lamp and a fourth period in which fourth alternating-current power having a fourth frequency higher than the second frequency is supplied to the discharge lamp,
    the second lighting start period alternately includes the first period and the second period, and
    the third frequency is lower than the fourth frequency, and varies in a stepwise manner.

4. The discharge lamp drive device according to claim 3, wherein
    the later the third period is disposed, the lower the third frequency is.

5. The discharge lamp drive device according to claim 4, wherein
    the resonant circuit section includes a capacitor constituting an LC series resonant circuit,
    the first lighting start period includes a plurality of third periods including at least a later third period and an earlier third period occurring before the later third period, and
    in a case in which an inter-terminal voltage of the capacitor in the later third period is lower than the inter-terminal voltage in the earlier third period, the control section sets the value of the third frequency in the earlier third period to be the first frequency, and performs a transition of the lighting start period from the first lighting start period to the second lighting start period.

6. The discharge lamp drive device according to claim 5, wherein the control section sets a frequency, which is equal to or higher than the third frequency in a third period occurring before the earlier third period and is lower than the fourth frequency, to be the second frequency.

7. The discharge lamp drive device according to claim 5, wherein the control section sets the value of the third frequency in a third period occurring before the earlier third period to be the second frequency.

8. The discharge lamp drive device according to claim 1, wherein the resonant circuit section has just one coil.

9. A projector comprising:
    a discharge lamp configured to emit light;
    the discharge lamp drive device according to claim 1;
    a light modulation device configured to modulate the light emitted from the discharge lamp in accordance with an image signal; and
    a projection optical system configured to project the light modulated by the light modulation device.

10. A projector comprising:
    a discharge lamp configured to emit light;
    the discharge lamp drive device according to claim 2;
    a light modulation device configured to modulate the light emitted from the discharge lamp in accordance with an image signal; and
    a projection optical system configured to project the light modulated by the light modulation device.

11. A projector comprising:
    a discharge lamp configured to emit light;
    the discharge lamp drive device according to claim 3;
    a light modulation device configured to modulate the light emitted from the discharge lamp in accordance with an image signal; and
    a projection optical system configured to project the light modulated by the light modulation device.

12. A projector comprising:
    a discharge lamp configured to emit light;
    the discharge lamp drive device according to claim 4;
    a light modulation device configured to modulate the light emitted from the discharge lamp in accordance with an image signal; and
    a projection optical system configured to project the light modulated by the light modulation device.

13. A projector comprising:
    a discharge lamp configured to emit light;
    the discharge lamp drive device according to claim 5;

a light modulation device configured to modulate the light emitted from the discharge lamp in accordance with an image signal; and a projection optical system configured to project the light modulated by the light modulation device.

14. A projector comprising:

a discharge lamp configured to emit light;

the discharge lamp drive device according to claim 6;

a light modulation device configured to modulate the light emitted from the discharge lamp in accordance with an image signal; and a projection optical system configured to project the light modulated by the light modulation device.

15. A projector comprising:

a discharge lamp configured to emit light;

the discharge lamp drive device according to claim 7;

a light modulation device configured to modulate the light emitted from the discharge lamp in accordance with an image signal; and a projection optical system configured to project the light modulated by the light modulation device.

16. A projector comprising:

a discharge lamp configured to emit light;

the discharge lamp drive device according to claim 8;

a light modulation device configured to modulate the light emitted from the discharge lamp in accordance with an image signal; and a projection optical system configured to project the light modulated by the light modulation device.

17. A discharge lamp drive method for alternately supplying alternating-current power, which includes first alternating-current power having a first frequency adapted to cause a resonance of a resonant circuit section and second alternating-current power having a second frequency higher than the first frequency, to a discharge lamp via the resonant circuit section in a lighting start period until the discharge lamp reaches a steady lighting state, the method comprising:

supplying, in the lighting start period, third alternating-current power having a third frequency equal to or higher than the first frequency and fourth alternating-current power having a fourth frequency higher than the second frequency alternately to the discharge lamp via the resonant circuit section;

lowering the third frequency in a stepwise manner in a plurality of third-frequency periods during the lighting start period;

in a case in which an inter-terminal voltage of a capacitor in the resonant circuit section in supplying the discharge lamp with the third alternating-current power decreases, setting the value of the third frequency in a third-frequency period that occurs one third-frequency period before a current third-frequency period to be the first frequency and setting the value of the third frequency in a third-frequency period that occurs two or more third-frequency periods earlier than the current third-frequency period to be the second frequency; and supplying the first alternating-current power and the second alternating-current power alternately to the discharge lamp via the resonant circuit section.

* * * * *